US012068537B2

(12) United States Patent
Fourie et al.

(10) Patent No.: US 12,068,537 B2
(45) Date of Patent: Aug. 20, 2024

(54) HELICAL ANTENNA

(71) Applicant: POYNTING ANTENNAS (PTY) LIMITED, Pretoria (ZA)

(72) Inventors: Andries Petrus Cronje Fourie, Johannesburg (CA); Derek Colin Nitch, Johannesburg (CA)

(73) Assignee: POYNTING ANTENNAS (PTY) LIMITED, Pretoria (ZA)

(*) Notice: Subject to any disclaimer, the term of this patent is extended or adjusted under 35 U.S.C. 154(b) by 267 days.

(21) Appl. No.: 17/623,822

(22) PCT Filed: Jul. 3, 2020

(86) PCT No.: PCT/IB2020/056300
§ 371 (c)(1),
(2) Date: Dec. 29, 2021

(87) PCT Pub. No.: WO2021/001799
PCT Pub. Date: Jan. 7, 2021

(65) Prior Publication Data

US 2022/0255231 A1 Aug. 11, 2022

(30) Foreign Application Priority Data

Jul. 4, 2019 (ZA) ................................ 2019/04391

(51) Int. Cl.
*H01Q 11/08* (2006.01)
*H01Q 1/22* (2006.01)
(Continued)

(52) U.S. Cl.
CPC ............. *H01Q 11/083* (2013.01); *H01Q 1/22* (2013.01); *H01Q 1/36* (2013.01); *H01Q 1/362* (2013.01);
(Continued)

(58) Field of Classification Search
CPC ........ H01Q 11/083; H01Q 1/22; H01Q 1/362; H01Q 9/045; H01Q 11/08; H01Q 1/36; H01Q 9/04
(Continued)

(56) References Cited

U.S. PATENT DOCUMENTS 5,216,436 A * 6/1993 Hall ..................... H01Q 11/086 343/895
5,329,287 A * 7/1994 Strickland .............. H01Q 11/08 343/895
(Continued)

FOREIGN PATENT DOCUMENTS

IT FI20130071 A1 9/2014

OTHER PUBLICATIONS

N. Padros et al., "Comparative Study of High-Performance GPD Receiving Antenna Designs", IEEE Transactions on Antennas and Propagation 45(4): 698-706 (1997).
(Continued)

*Primary Examiner* — Hai V Tran
(74) *Attorney, Agent, or Firm* — Merchant & Gould P.C.

(57) ABSTRACT

An antenna 10 comprises a single wire wound in a helix 12 comprising a plurality of turns 1, 2, 3, n, n+1, . . . p around a main axis 11 with immediately adjacent turns having an inter-turn spacing between them. The helix has a back end 14 and a front end 16 and the main axis defines a main beam direction. A transverse crosssectional area of the helix monotonously decreases from the back end 14 to the front end 16. The inter-turn spacing $S_1 \ldots S_n \ldots$ monotonously decreases from the backend 14 to the front end 16. A feed-point 13 is provided at the back end 14.

9 Claims, 6 Drawing Sheets

(51) Int. Cl.
*H01Q 1/36* (2006.01)
*H01Q 9/04* (2006.01)

(52) U.S. Cl.
CPC ............... *H01Q 9/04* (2013.01); *H01Q 9/045* (2013.01); *H01Q 11/08* (2013.01)

(58) Field of Classification Search
USPC .......................................................... 343/895
See application file for complete search history.

(56) References Cited

U.S. PATENT DOCUMENTS

| | | | | |
|---|---|---|---|---|
| 7,286,099 | B1 * | 10/2007 | Lier | H01Q 1/362<br>343/895 |
| 9,923,266 | B1 * | 3/2018 | Casperson | H01Q 1/362 |
| 2003/0028095 | A1 * | 2/2003 | Tulley | G01R 33/287<br>600/422 |

OTHER PUBLICATIONS

K. Kholotov et al., "3D Antenna for GHz Application and Vibration Energy Harvesting", IEEE 65th Electronic Components and Technology Conference (ECTC): 2018-2023 (2013).

International Search Report and Written Opinion for PCT/IB2020/056300 (Sep. 18, 2020).

* cited by examiner

HELICAL ANTENNA

This application is a National Stage Application of PCT/IB2020/056300, filed Jul. 3, 2020, which claims benefit of Patent Application No. 2019/04391, filed Jul. 4, 2019 in South Africa, and which applications are incorporated herein by reference. To the extent appropriate, a claim of priority is made to each of the above-disclosed applications.

INTRODUCTION AND BACKGROUND

This invention relates to an antenna, more particularly a helical antenna.

A helical antenna is an antenna comprising of one or more conducting wires wound in the form of a helix. One known family of helical antennas is the family of axial mode helices where the antenna diameter is more or less 1 wavelength at the frequency of operation and the helix is typically several wavelengths in length. Such antennas have a main axis, a front end and a back end and radiate in axial or end-fire mode with a main beam along the main axis.

Known embodiments of such helical antennas include a uniform diameter helical antenna comprising of a single (unifiliar) helical conductor which is fed at the back end of the antenna and radiates a main beam. Such helical antennas exhibit good gain dependent on the length of the helix, while bandwidth is typically limited to about 20% of a centre frequency of a frequency band of operation. Unifiliar back end fed helices with a tapering helix diameter, but constant inter-turn spacing along the length have also been described. These antennas achieve some marginal increase in bandwidth. Helices with a step change in both diameter and inter-turn spacing are also known, but performance across the operational frequency band is unsatisfactory. Uniform diameter helixes with both a taper in diameter and decrease in inter-turn spacing for the last few turns towards the front end are also known, but once again, give only a small improvement in antenna bandwidth.

Bifiliar helical antennas comprising two helical conductors spaced 180 degrees are a different family of helical antennas in that the excitation is applied between the two helical conductors, typically at the front end of the antenna. These antennas often are tapered in diameter and the inter-turn spacing decreases. These antennas cover large bandwidths. They are often referred to as log-spiral or log conical spiral helices. These antennas hence achieve a bandwidth extension, but their gain, when configured as electrically long helices, are much lower than comparable back fed helical antennas. They are also more complex due to the two conductors and require a balanced feed-point at the front end of the antenna.

Object of the Invention

It is an object of the present invention to provide an alternative helical antenna with which the applicant believes the above problems may at least be alleviated or which would provide a useful alternative for the known helical antennas.

SUMMARY OF THE INVENTION

According to the invention there is provided a unifiliar axial mode helical antenna comprising:

- a single wire wound in a helix comprising a plurality of turns around a main axis with adjacent turns having an inter-turn spacing between them, the helix having a back end and a front end and the main axis defining a main beam direction, a transverse cross sectional area of the helix monotonously decreasing from the back end to the front end and the inter-turn spacing monotonously decreasing from the backend to the front end; and
- a feed-point at the back end.

The turns may be substantially circular, each having a respective diameter and wherein the respective diameters decrease from the back end to the front end.

The antenna may have a frequency band of operation or interest having a first lower frequency, a second higher frequency and a centre frequency, and the helix may have a length which is at least two wavelengths of a signal at the centre frequency.

The antenna may comprise p turns comprising a $1^{st}$ turn at the back end through to a $p^{th}$ turn at the front end. A ratio between the diameter of the $1^{st}$ turn at the back end with the largest diameter and the $p^{th}$ turn at the front end with the smallest diameter may be larger than 1.2:1 and smaller than 3:1.

In one embodiment, a relationship defining the diameter of the turns and their inter-turn spacing is:

$$\tau = \frac{D_{n+1}}{D_n} = \frac{S_{n+1}}{S_n}$$

where $D_n$ is the diameter of the $n^{th}$ turn, $D_{n+1}$ is the diameter of the turn immediately adjacent turn n towards the front end 16 and $S_n$ is the spacing between turns n and n+1. $S_{n+1}$ has a corresponding meaning.

A relationship between the diameter of a turn n and its spacing from a next successive turn n+1 is given by:

$$\sigma = \frac{Sn}{2Dn}$$

The diameter of the $1^{st}$ and largest turn at the back end may be chosen such that:

$$\pi D_1 = C_1 = K_1 \lambda_{max}$$

where:

- $C_1$ is the circumference of the $1^{st}$ turn;
- $\lambda_{max}$ is the wavelength of the lower frequency of the above frequency band; and
- K1 is a chosen truncation coefficient.

Similarly, the diameter of the $p^{th}$ or smallest turn at the front end is given by $$\pi D_p = C_p = K_2 \lambda_{min}$$

where:

- $C_p$ is the circumference of the $p^{th}$ turn;
- $\lambda_{min}$ is the wavelength of the higher frequency of the above frequency band; and
- $K_2$ is also a truncation coefficient.

The antenna may be driven at the feed-point at the back end between a ground plane and the largest or $1^{st}$ turn.

BRIEF DESCRIPTION OF THE DIAGRAMS

The invention will now be described, by way of example only, with reference to the accompanying diagrams wherein.

DESCRIPTION OF A PREFERRED EMBODIMENT OF THE INVENTION

Figure 1:
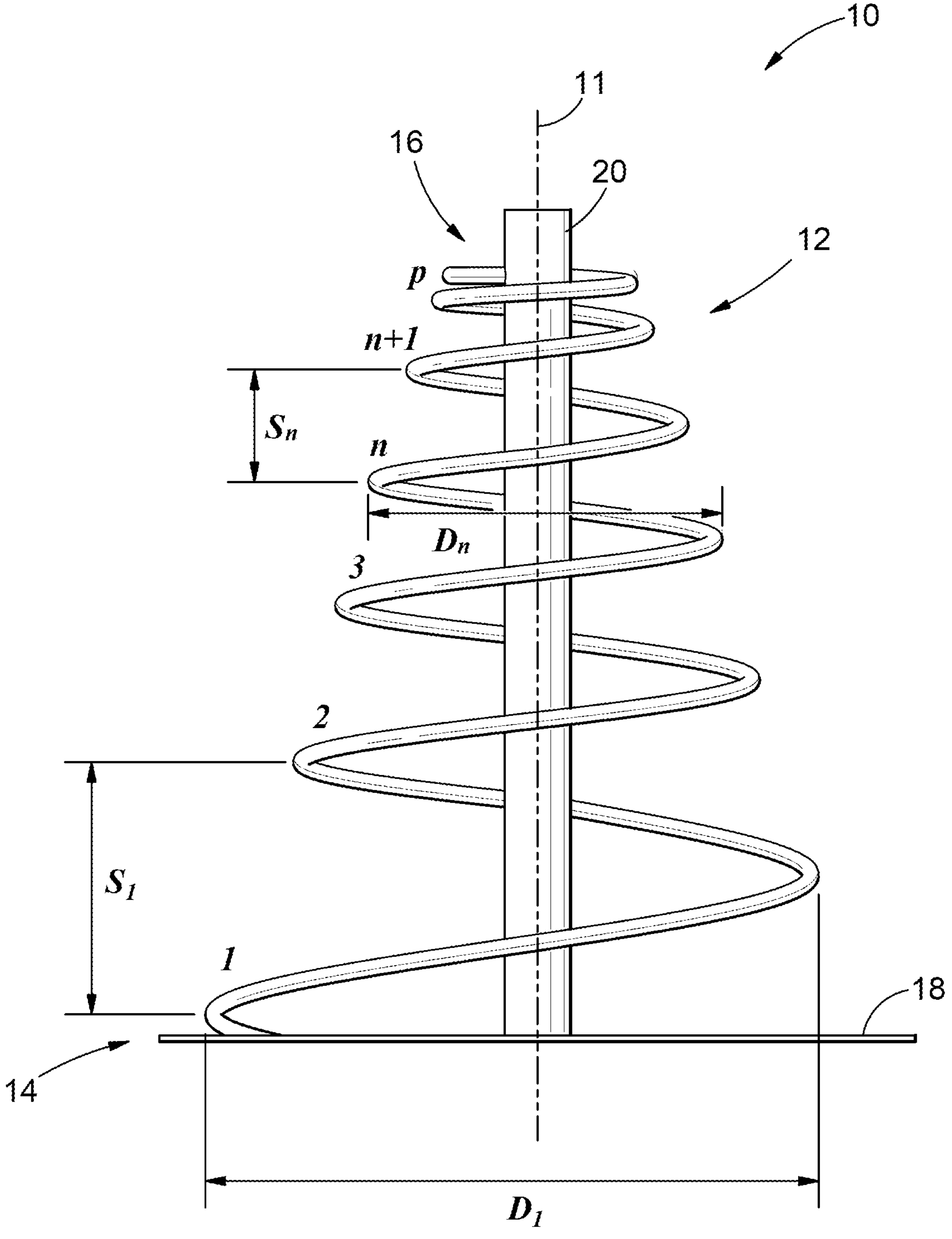
FIG. 1 is a side elevation of an example embodiment of a helical antenna.

An example embodiment of a unifiliar axial mode helical antenna is generally designated by the reference numeral 10 in the diagrams.

The antenna 10 comprises a single wire wound in a helix 12 comprising a plurality of turns 1, 2, 3, n, n+1, . . . p around a main axis 11 with immediately adjacent turns having an inter-turn spacing between them. The helix having a back end 14 and a front end 16 and the main axis defines a main beam direction.

A transverse cross-sectional area of the helix monotonously decreases from the back end 14 to the front end 16. The inter-turn spacing $S_1 \ldots S_n \ldots$ monotonously decreases from the backend 14 to the front end 16. A feed-point 13 (shown in FIG. 2) is provided at the back end 14.

The antenna 10 comprises a ground plane 18 and a pillar 20 for supporting the arrangement.

Each turn has a respective transverse cross-sectional area and an inter-turn spacing $S_n$ between a turn n and an immediately adjacent turn n+1 in a direction towards the front end 16. In a presently preferred embodiment, the turns are substantially circular, each having a respective diameter $D_1, \ldots D_n, D_{n+1}, \ldots D_p$.

In this preferred embodiment, a relationship defining the diameter of the turns and their spacing is:

$$\tau = \frac{D_{n+1}}{D_n} = \frac{S_{n+1}}{S_n}$$

where $D_n$ is the diameter of the $n^{th}$ turn, $D_{n+1}$ is the diameter of the turn immediately adjacent turn n towards the front end 16 and $S_n$ is the spacing between turns n and n+1. $S_{n+1}$ has a corresponding meaning.

A relationship between the diameter of a turn n and its spacing from a next successive turn n+1 is given by:

$$\sigma = \frac{Sn}{2Dn}$$

In an example embodiment, it may be desired to cover a frequency band extending from $f_{min}$ to $f_{max}$ and having a centre frequency $f_c$.

The diameter of the a $1^{st}$ or largest turn at the back end 14 is chosen such that:

$$\pi D_1 = C_1 = K_1 \lambda_{max}$$

where:

$C_1$ is the circumference of the $1^{st}$ turn;

$\lambda_{max}$ is the wavelength associated with $f_{min}$; and

K1 is a chosen truncation coefficient.

Similarly, the diameter of the $p^{th}$ or smallest turn at the front end 16 is given by $$\pi D_p = C_p = K_2 \lambda_{min}$$

where:

$C_p$ is the circumference of the $p^{th}$ turn;

$\lambda_{min}$ is the wavelength associated with $f_{max}$; and $K_2$ is also a truncation coefficient.

Figure 2:
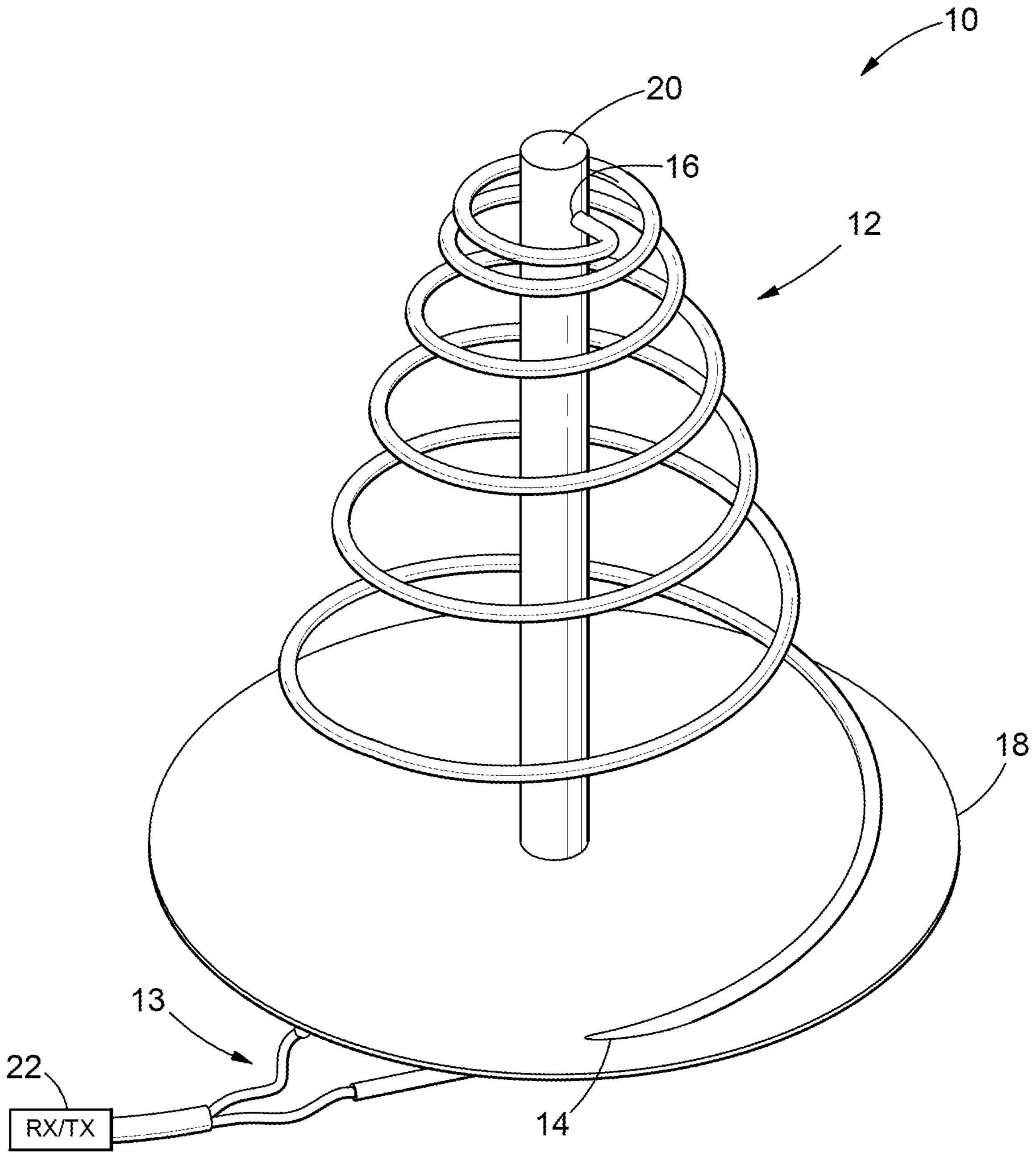
FIG. 2 is a perspective view of the antenna connected to a transceiver.

The antenna may be driven at feed-point 13. In FIG. 2, a transceiver 22 is provided connected to the feed-point. The antenna may be a transmitting and/or a receiving antenna.

In FIGS. 3 to 6 there are self-explanatory diagrams for comparing performance of a prior art, constant inter-turn spacing (or fixed pitch) tapering antenna and an example embodiment of an antenna according to the invention in terms of a) gain against frequency, b) VSWR against frequency c) radiation pattern at 3000 MHz and d) radiation pattern at 5000 MHz, respectively.

The prior art antenna is 250 mm in length, the constant inter-turn spacing is 10 mm, the radius of the $1^{st}$ turn is 21 mm and the radius of the last turn (or turn at the front end) is 1 mm. The example embodiment of the antenna according to the invention has a length of 250 mm, the inter-turn spacing decreases logarithmically from 22 mm to 0.5 mm, the radius of the $1^{st}$ turn is 15 mm and the radius of the last turn is 2.5 mm.

Figure 3:
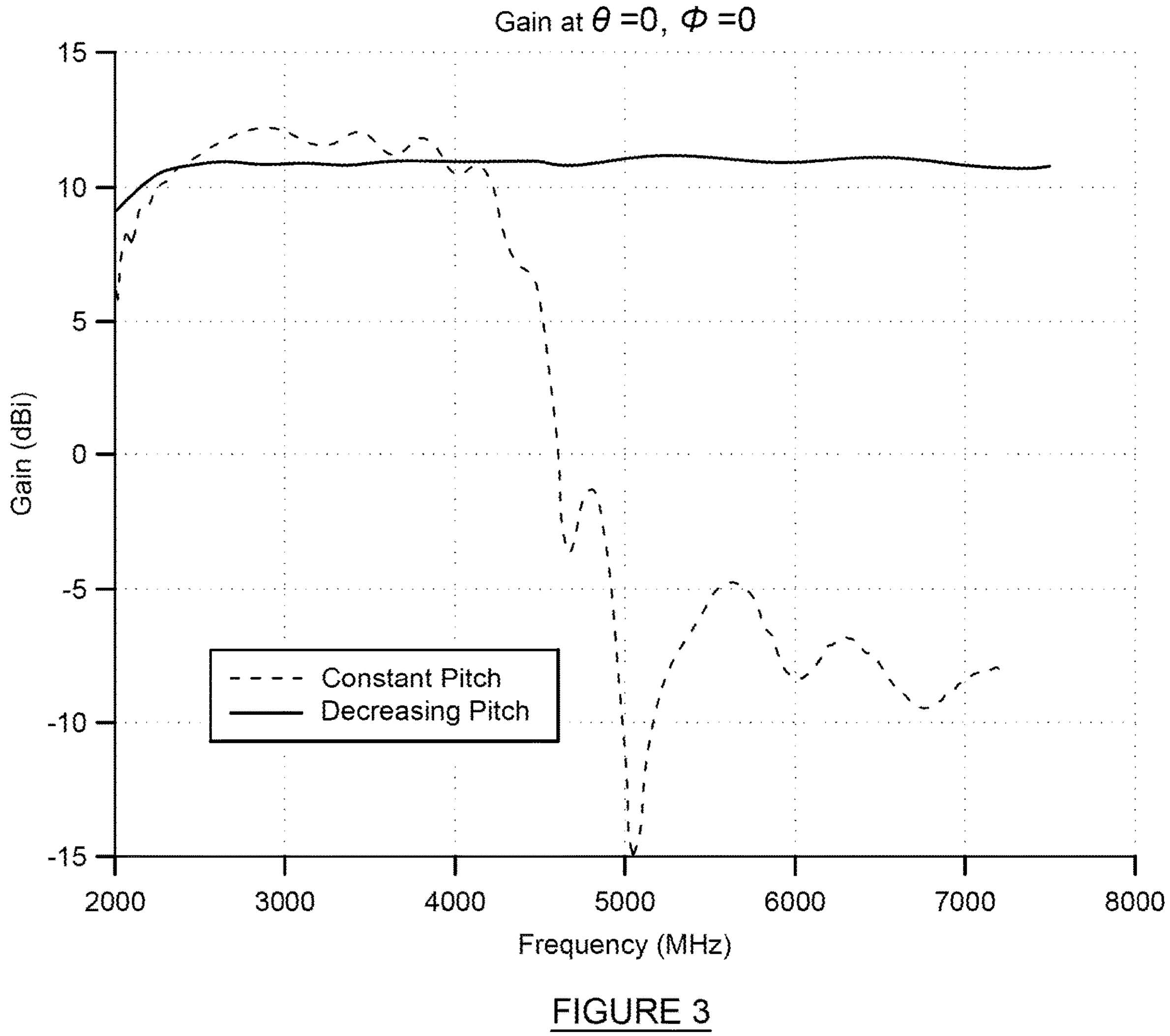
FIG. 3 is a graph of gain against frequency for comparing performance of a prior art, constant inter-turn spacing (or fixed pitch) tapering antenna and an example embodiment of antenna according to the invention.
Figure 4:
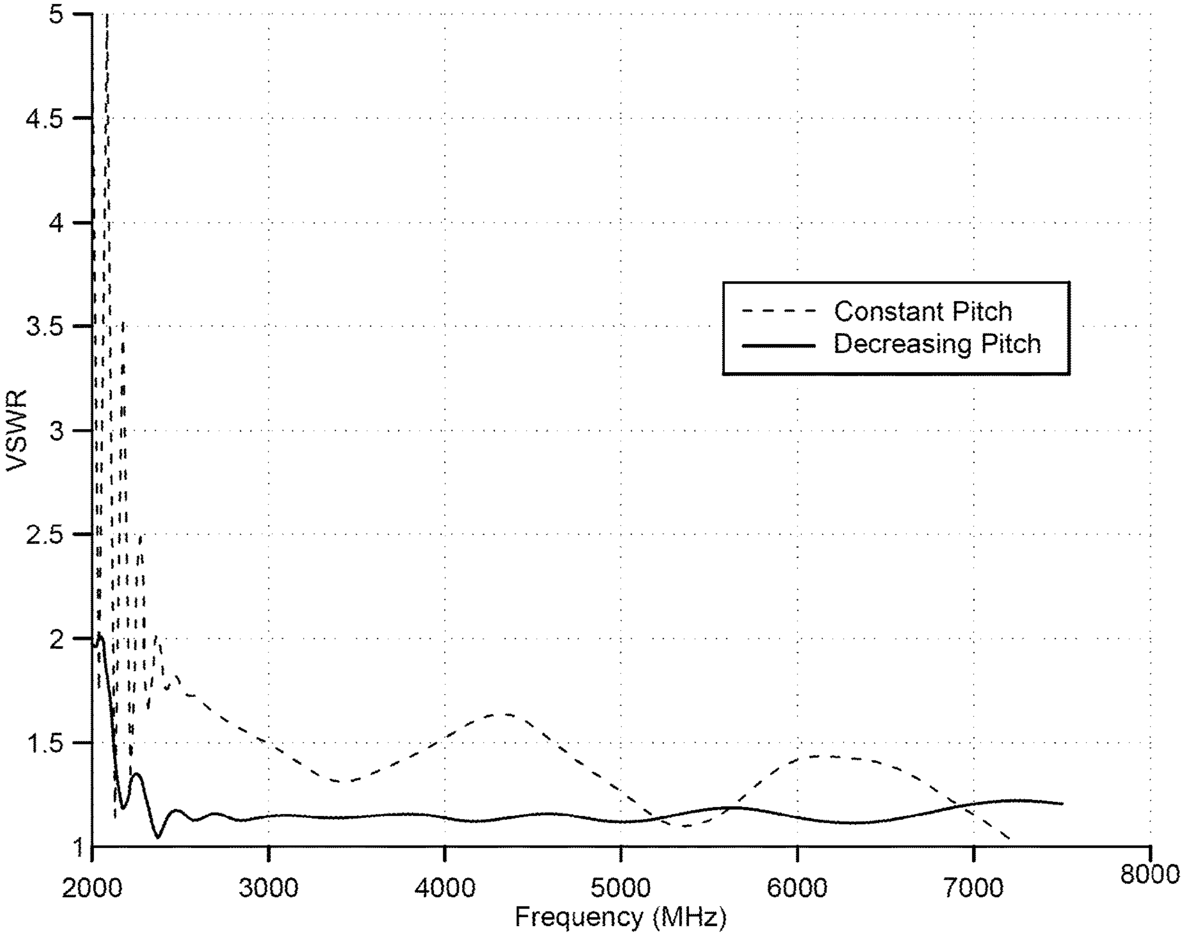
FIG. 4 is a graph of VSWR against frequency for the antennas referred to immediately above.
Figure 5:
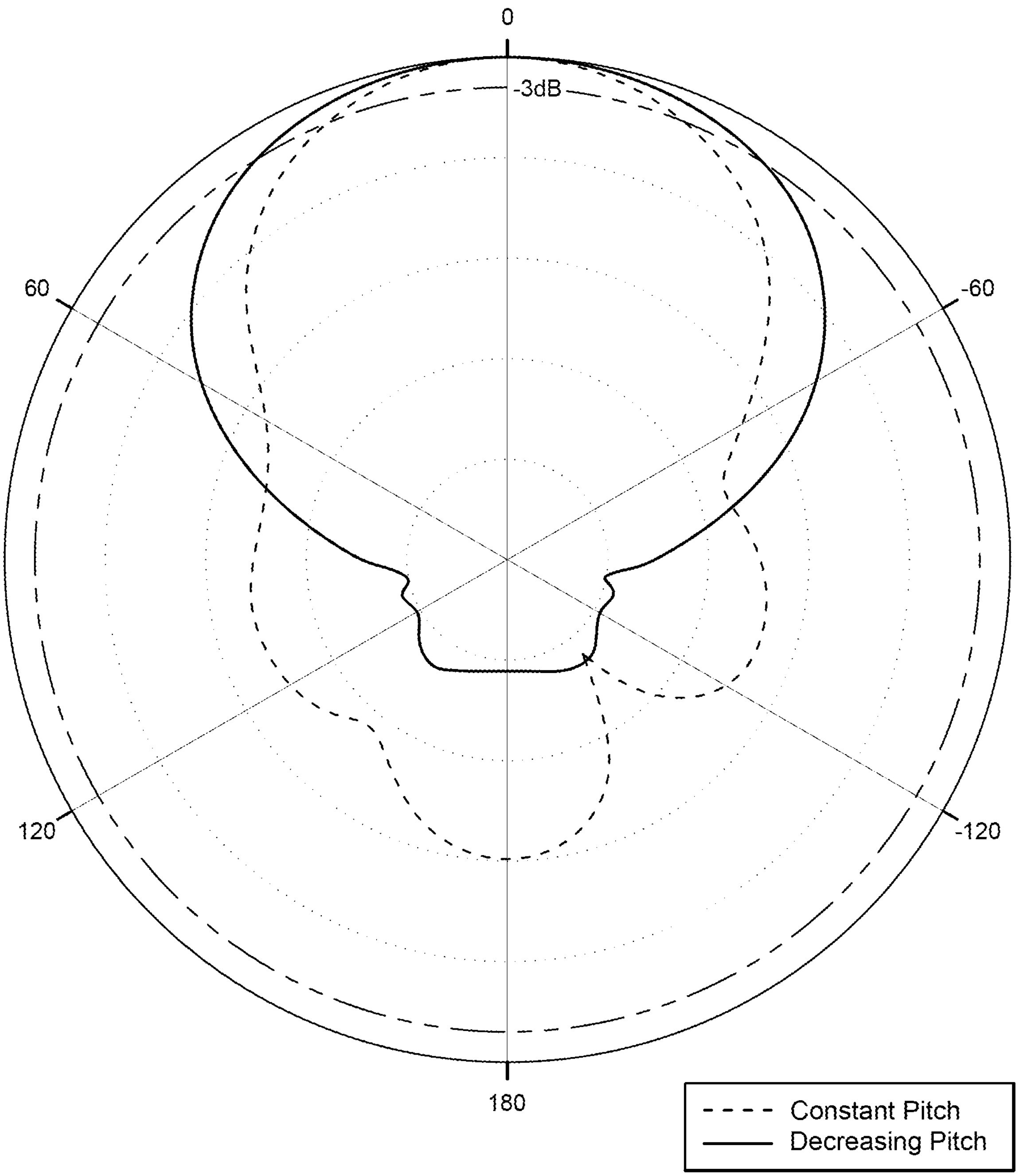
FIG. 5 show radiation patterns at 3000 MHz for the antennas.
Figure 6:
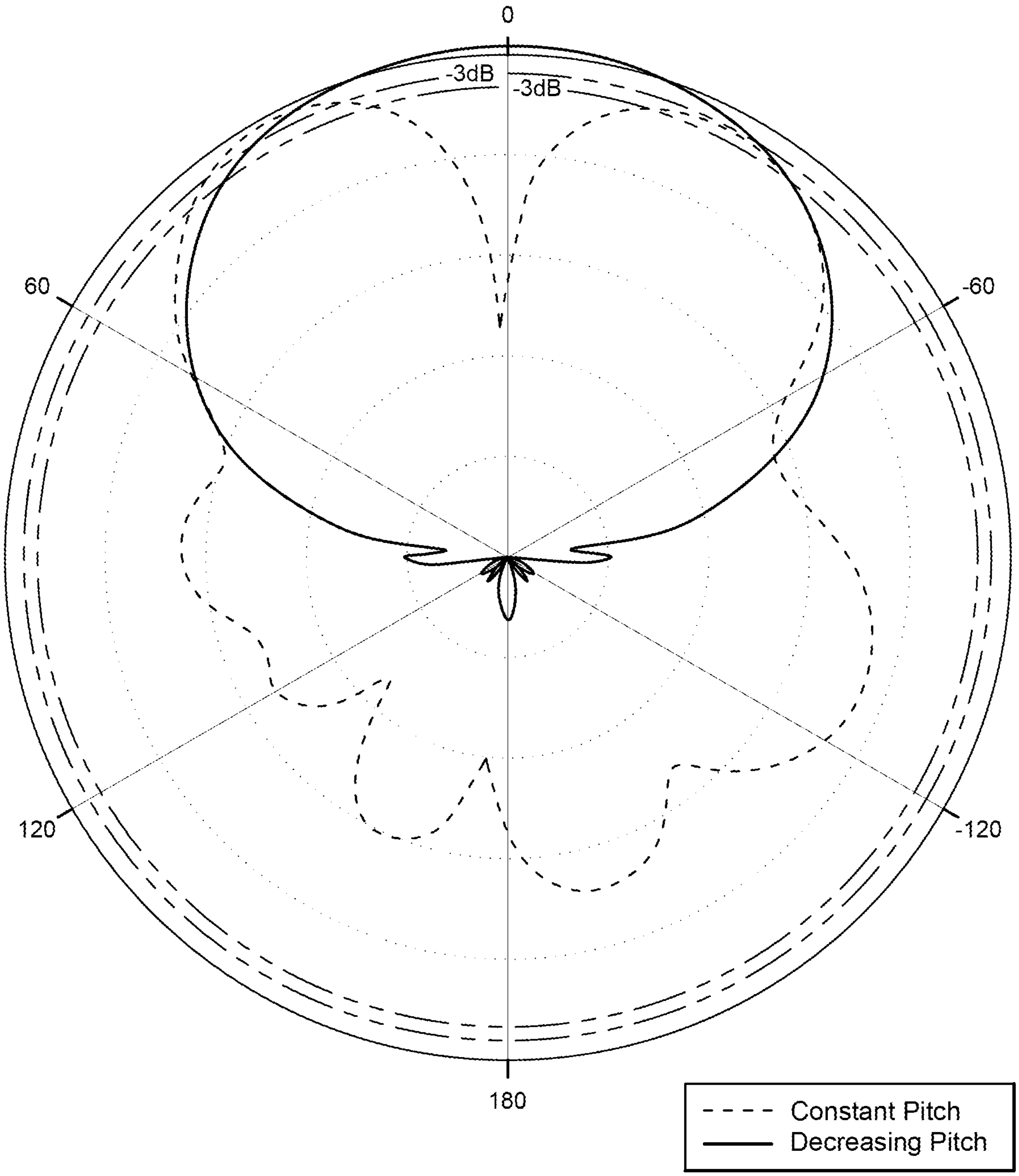
FIG. 6 show radiation patterns at 5000 MHZ for the antennas.

As can be seen in FIG. 3, the example embodiment of the antenna according to the invention has a far superior gain bandwidth extending from about 2200 MHz to 7000 MHz. The prior art antenna has a gain bandwidth of from about 2200 MHz to 4000 MHz. FIG. 4 illustrates superior VSWR over the band from 2200 MHz to 7000 MHz for the example embodiment of the antenna according to the invention. FIG. 5 illustrates the radiation patterns of both the antennas at 3000 MHz. FIG. 6 compares the radiation patterns at 5000 MHz and illustrates a superior pattern for the example embodiment of the antenna according to the invention, especially along the main axis, where the prior art antenna exhibits severe degradation.

The invention claimed is:

1. A unifiliar axial mode helical antenna comprising:

a single wire wound in a helix comprising a plurality of turns around a main axis with adjacent turns having an inter-turn spacing between them, the helix having a back end and a front end and the main axis defining a main beam direction, a transverse cross-sectional area of the helix monotonously decreasing from the back end to the front end and the inter-turn spacing monotonously decreasing from the backend to the front end; and a feed-point at the back end.

2. The antenna as claimed in claim 1 wherein the turns are circular, each having a respective diameter and wherein the respective diameters of the turns decrease from the back end to the front end.

3. The antenna as claimed in claim 2 wherein the antenna comprises p turns comprising a $1^{st}$ turn at the back end through to a $p^{th}$ turn at the front end and wherein a ratio between the diameter of the $1^{st}$ turn with the largest diameter and the $p^{th}$ turn with the smallest diameter is larger than 1.2:1 and smaller than 3:1.

4. The antenna as claimed in claim 3 wherein the diameter of the $1^{st}$ turn is given by:

$$\pi D_1 = C_1 = K_1 \lambda_{max}$$

where:

$C_1$ is the circumference of the $1^{st}$ turn;

$\lambda_{max}$ is the wavelength of the first frequency of the frequency band; and K1 is a chosen truncation coefficient.

5. The antenna as claimed in claim 3 wherein the diameter of the $p^{th}$ turn is given by:

$$\pi D_p = C_p = K_2 \lambda_{min}$$

where:

$C_p$ is the circumference of the $p^{th}$ turn;

$\lambda_{min}$ is the wavelength of the second frequency of the frequency band; and $K_2$ is also a truncation coefficient.

6. The antenna as claimed in claim 3 comprising a ground plane and a pillar mounted on the ground plane for supporting the helix and wherein the feed-point is provided between the ground plane and the $1^{st}$ turn.

7. The antenna as claimed in claim 2 wherein a relationship defining the diameter of the turns and their inter-turn spacing is:

$$\tau = \frac{D_{n+1}}{D_n} = \frac{S_{n+1}}{S_n}$$

where $D_n$ is the diameter of the $n^{th}$ turn, $D_{n+1}$ is the diameter of the turn immediately adjacent turn n towards the front end and $S_n$ is the spacing between turns n and n+1.

8. The antenna as claimed in claim 2 wherein a relationship between the diameter of a turn n and its spacing from a next successive turn n+1 is given by:

$$\sigma = \frac{Sn}{2Dn}.$$

9. The antenna as claimed in claim 1 having an operational bandwidth extending between a first lower frequency and a second higher frequency and having a centre frequency, wherein the helix has a length which is at least two wavelengths of a signal at the centre frequency.

* * * * *